(12) United States Patent
Muench et al.

(10) Patent No.: US 10,746,285 B2
(45) Date of Patent: Aug. 18, 2020

(54) PLANETARY CARRIER FOR A GEARSET STAGE OF A PLANETARY GEARSET, AND PRETENSIONING METHOD

(71) Applicant: ZF FRIEDRICHSHAFEN AG, Friedrichshafen (DE)

(72) Inventors: Joerg Muench, Wuppertal (DE); Dirk Strasser, Breckerfeld (DE); Ralf Sperlich, Witten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/779,535

(22) PCT Filed: Nov. 22, 2016

(86) PCT No.: PCT/EP2016/078425
§ 371 (c)(1),
(2) Date: May 28, 2018

(87) PCT Pub. No.: WO2017/093075
PCT Pub. Date: Jun. 8, 2017

(65) Prior Publication Data
US 2019/0032771 A1    Jan. 31, 2019

(30) Foreign Application Priority Data

Nov. 30, 2015   (DE) .................... 10 2015 223 667

(51) Int. Cl.
*F16H 57/08*    (2006.01)
*F03D 15/00*    (2016.01)
(Continued)

(52) U.S. Cl.
CPC ........... *F16H 57/082* (2013.01); *F03D 15/00* (2016.05); *F16C 19/364* (2013.01);
(Continued)

(58) Field of Classification Search
CPC .................... F16C 2361/61; F16H 57/082
See application file for complete search history.

(56) References Cited

U.S. PATENT DOCUMENTS

2006/0293142 A1    12/2006  Torres et al.
2007/0039187 A1*    2/2007  Guempel ................ B21B 31/07
                                                       29/898.09
(Continued)

FOREIGN PATENT DOCUMENTS

DE    102007042770 A1    3/2009
DE    102010040748 A1    3/2012
(Continued)

OTHER PUBLICATIONS

Machine translation of DE 102010040748 filed Jul. 21, 2019. (Year: 2019).*

*Primary Examiner* — Tisha D Lewis
(74) *Attorney, Agent, or Firm* — Leydig, Voit & Mayer, LTD.

(57) ABSTRACT

A planetary carrier for a gear stage of a planetary gearset includes at least one planetary pin that is disposed in a rotationally fixed manner in the planetary carrier, and a pair of tapered roller bearings that are disposed on the planetary pin supporting a planet gear. The planetary pin is fastened by a pin screw connection, which comprises a pin screw and a nut, to the planetary carrier. The tapered roller bearings are clamped against each other between the planetary carrier and the planet pin and are axially pretensioned by the pin screw connection.

16 Claims, 3 Drawing Sheets

(51) Int. Cl.
    *F16C 25/06* (2006.01)
    *F16C 19/54* (2006.01)
    *F16C 19/36* (2006.01)

(52) U.S. Cl.
    CPC ............ *F16C 19/543* (2013.01); *F16C 25/06*
        (2013.01); *F05B 2230/60* (2013.01); *F05B*
        *2260/40311* (2013.01); *F16C 2360/31*
        (2013.01); *F16C 2361/61* (2013.01); *F16H*
        *2057/085* (2013.01); *Y02E 10/722* (2013.01)

(56) References Cited

U.S. PATENT DOCUMENTS

| | | | | |
|---|---|---|---|---|
| 2012/0114488 | A1* | 5/2012 | Giger | F16H 1/227 |
| | | | | 416/170 R |
| 2017/0201154 | A1* | 7/2017 | Brassitos | H02K 7/116 |
| 2017/0227115 | A1* | 8/2017 | Smook | F16H 57/082 |

FOREIGN PATENT DOCUMENTS

| | | |
|---|---|---|
| EP | 0715087 A2 | 6/1996 |
| EP | 2072858 A1 | 6/2009 |
| WO | WO 2013043822 A2 | 3/2013 |

\* cited by examiner

PLANETARY CARRIER FOR A GEARSET STAGE OF A PLANETARY GEARSET, AND PRETENSIONING METHOD

CROSS REFERENCE TO RELATED APPLICATIONS

This application is a U.S. National Stage Application under 35 U.S.C. § 371 of International Application No. PCT/EP2016/078425 filed on Nov. 22, 2016, and claims benefit to German Patent Application No. DE 10 2015 223 667.6 filed on Nov. 30, 2015. The International Application was published in German on Jun. 8, 2017 as WO 2017/093075 A1 under PCT Article 21(2).

FIELD

The present invention relates to a planetary carrier for a gearset stage of a planetary gearset, particularly a multi-stage planetary gearset for wind turbine and industrial systems with pretensioned roller bearings.

BACKGROUND

A planetary gearset of the aforementioned type is suitable for the power transfer in the multi-Mega-Watt range, wherein a slow rotary motion of a drive shaft is converted to a fast rotary motion of a gearset output shaft. At least on one planetary pin, the planetary gearset can have a bearing apparatus for rotatably mounting a planet gear. The bearing apparatus can comprise at least two roller bearings that are disposed between the planet gear and the planetary pin; for example, cylindrical roller bearings or tapered roller bearings, wherein the at least two roller bearings each include an inner ring and optionally an outer ring. The inner ring can be connected in an antitorque manner with the planetary pin, and the outer ring can be connected in an antitorque manner with the planet gear enabling a rotational mounting of the planet gears within the planetary gearset.

Pretensioning bearing apparatuses by means of a pair of tapered roller bearings with the use of a lid-type construction and hex-head screws is known in the art. Further known in the art is a bearing apparatus with cylindrical roller bearings that are pretensioned with a hex-head screw, particularly to ensure the non-slip operation of the planetary gearset. However, the rotational tightening method that is typically employed in this context can result in imprecise pretensioning forces coupled with a relatively large dispersion of friction moments below a screw-head contact surface. In addition, such pretensioning is usually associated with minimal clamping length of the screws, thus creating the risk that the pretension may come loose and is only of very limited robustness relative to torsional deformations of the planetary carrier.

The bearing apparatus with its roller bearings is a very sensitive piece of machinery; the pretensioning of the bearings must be adjusted very precisely and permanently maintained to guarantee the reliability of the planetary gearset for the duration of the required operating life thereof.

SUMMARY

In an embodiment, the present invention provides a planetary carrier for a gear stage of a planetary gearset. The planetary carrier includes at least one planetary pin that is disposed in a rotationally fixed manner in the planetary carrier, and a pair of tapered roller bearings that are disposed on the planetary pin supporting a planet gear. The planetary pin is fastened by means of a pin screw connection, which comprises a pin screw and a nut, to the planetary carrier. The tapered roller bearings are clamped against each other between the planetary carrier and the planet pin and are axially pretensioned by means of the pin screw connection.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
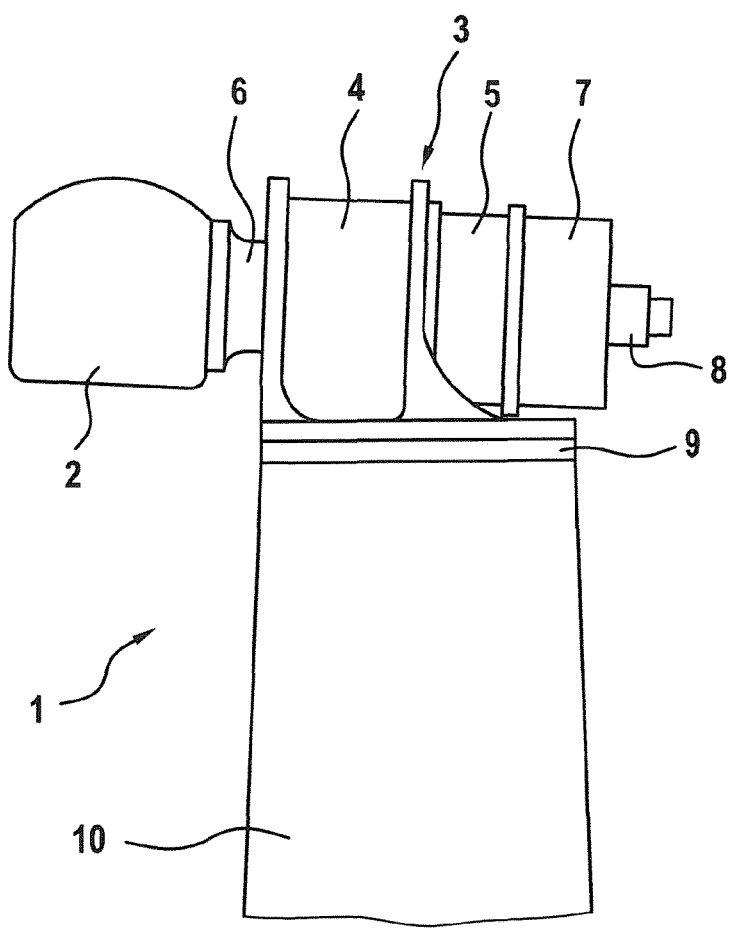
FIG. 1 provides a schematic side view of a top part of a wind turbine generator system with a planetary gearset.

Embodiments of the present invention provide planetary carriers for a gearset stage of a planetary gearset, particularly a multi-stage planetary gearset for wind turbine and industrial systems with pretensioned roller bearings, that include a bearing apparatus with a precisely adjusted and permanent preload force.

According to an embodiment of the invention, a planetary carrier for a gearset stage of a planetary gearset comprises at least one planetary pin that is mounted in a rotationally fixed manner in the planetary carrier and a pair of tapered roller bearings that are mounted on the planetary pin and support a planet gear. The planetary pin is fastened to the planetary carrier by means of a pin screw connection, which comprises a pin screw and a nut, and the tapered roller bearings are tensioned relative to each other between the planetary carrier (e.g. planetary carrier 11 including surface 11A in FIG. 2) and the planetary pin (e.g. planetary pin 12 including annular surface 12A in FIG. 2) by means of the pin screw connection, particularly in such a manner that they are axially preloaded. Instead of a pin screw connection, it is possible to envision two or a plurality of pin screw connections in the manner as described above or below.

In other words, according to an embodiment of the invention, pretensioning of a tapered roller bearing apparatus on a planetary pin is provided for, wherein the pretensioning can simultaneously achieve fastening of the planetary pin in a receiving bore of the planetary carrier. Preferably, the tapered roller bearings therein are positioned in an O-arrangement relative to each another and together form a bearing apparatus, wherein the tapered roller bearings can be disposed axially and at a distance relative to each other, particularly, on an outer circumferential surface of the planetary pin, for which purpose it is possible to provide a spacer ring that is positioned between the tapered roller bearings.

The pin screw can have a stud end and a nut end. The stud end can include an external thread by which the stud end is screwed into a threaded bore, such as, e.g., in form of a blind hole having an internal thread, of the planetary carrier. The nut end can also have an external thread by which the nut is screwed, by the nut's internal thread, to the nut end of the pin screw and fastened, such as, e.g., by means of a washer, relative to the planetary pin. This is how it is possible to fasten the planetary pin on the planetary carrier. On the side of the stud end, the planetary carrier can form an axial counter bearing for one of the tapered roller bearings, and the planetary pin can have a radial recess on the side of the nut that rests against one of the front sides of the tapered roller bearings applying a compressive force to the front side when the nut is fastened, whereby the tapered roller bearings are axially clamped between the axial counter bearing of the planet carrier and the radial recess of the planetary pin, and whereby they are axially pretensioned.

The planetary carrier according to the invention with the pin screw connection thereof facilitates the application of a precise and lasting pretensioning force acting upon the tapered roller bearings. The force is neither too small, as that would result in bearing slippage and an unfavorable load distribution due to possible deformations of the planetary carrier, nor is it too great possibly resulting in pretensioning that is too tight and resulting in an overload of the associated bearing apparatus, which can have negative effects on the life of the bearing apparatus. The pin screw connection can compensate any stretch additionally applied thereto due to the deformation of the planetary carrier, because the pin screw connection can have a particularly large clamp length ratio. The pin screw connection is therefore characterized by particularly great robustness.

According to one embodiment, it is envisioned that one through bore traverses the planetary pin in the longitudinal direction, wherein the pin screw extends within the through bore at a distance relative to the planetary pin. In this way, it is possible to avoid wear and statically indeterminate stages, when the pin screw and the through bore come in contact with each other.

According to another embodiment, it is envisioned that the nut has a centering element that is aligned in a depression of the planetary pin. By aligning the centering element, it is also possible to align, particularly to center, the pin screw relative to the planetary pin and/or the through bore thereof, whereby any contact between the pin screw and the through bore is particularly safely avoided in case of any deformation of the planetary carrier due to the application of a load, any slight distortion of the ideal positioning of the through bore and the pin screw relative to each other due to assembly, or any positional and situational deviations due to manufacturing, possibly resulting in undefined stresses and therefore wear and the failure of the pin screw connection.

Particularly positive results are achieved in this context when the centering element is a centering hub, a centering recess, a centering bush or a centering register.

Moreover, advantageously, it can be provided that the nut has an integrated washer. The term "integrated" in this context denotes that the nut and the washer are connected to each other thus forming a single part. This helps minimize micromovements and wear. Further, it is particularly preferred when the washer can rest with a small amount of play in a matching depression of the planetary pin, whereby the pin screw can be aligned and/or centered.

According to a further embodiment, it is envisioned that a position-securing element is eccentrically disposed in the planetary pin and the planetary carrier relative to the longitudinal axis of the planetary pin. The position-securing element can be disposed on the side of the planetary pin, particularly in a front side of the planetary pin at a distance relative to the center point thereof, for example by insertion, wherein a longitudinal axis of the centering element runs parallel relative to the longitudinal axis of the planetary pin. On the side of the planetary carrier, the position-securing element can be disposed, particularly inserted, in a contact surface of the planetary carrier that is oriented toward the front side. In the alternative, it is possible to provide tabs alongside the circumference of the planetary pin, such as, for example, cams or polygons, that have the capability of engaging in the corresponding recesses in the planetary carrier. The position-securing element thereby allows for a rotational positional determination of the planetary pin within the planetary carrier, such as, for example within at least one bore of the planetary bolt of the planetary carrier, preventing the planetary pin from rotating about its own longitudinal axis within the planetary carrier.

In other words, it is possible to provide touch-free guiding of the pin screw inside the planetary pin by means of the position-securing element, such as, for example, in form of a locating pin, matching receiving bores of the planetary pin and the planetary carrier, as well as a nut with a securing element, such as, for example, in form, and a centering hub on the pin screw on a free side of the planetary pin.

Particularly positive results are achieved in this context, when the further centering element is constituted of a cylindrical pin, a taper pin or a retaining bush.

The planetary gearset according to the invention comprises a planetary carrier according to the invention as described above. The wind turbine generator system comprises a planetary gearset according to the invention as stated above.

The method according to the invention for pretensioning a pair of tapered roller bearings in a planetary carrier as described above is characterized in that the nut is tightened by a hydraulic tightening method. This facilitates a particularly small dispersion of the pretensioning force of the assembly, and thereby a particularly precise adjustment thereof.

FIG. 1 shows a wind turbine generator system 1 with a hub 2 of a rotor, which is not shown here. The wind turbine generator system 1 comprises a multi-stage generator gearset in form of planetary gearing and/or a planetary gearset 3 with a first gear stage 4 and a second gear stage 5. The first gear stage 4 of the planetary gearset 3 is driven by a rotating tab 6 that is connected in a rotationally fixed manner with the hub 2 of a planetary carrier of the hub 2, which is not shown here in further detail. A generator 7 with a slip ring unit 8 is powered by the planetary gearset 3 on the side of the planetary gearset 3 opposite to the hub 2, which is disposed, together with the generator 7, above an azimuth bearing 9 on a tower 10 of the wind turbine generator system 1.

Figure 2:
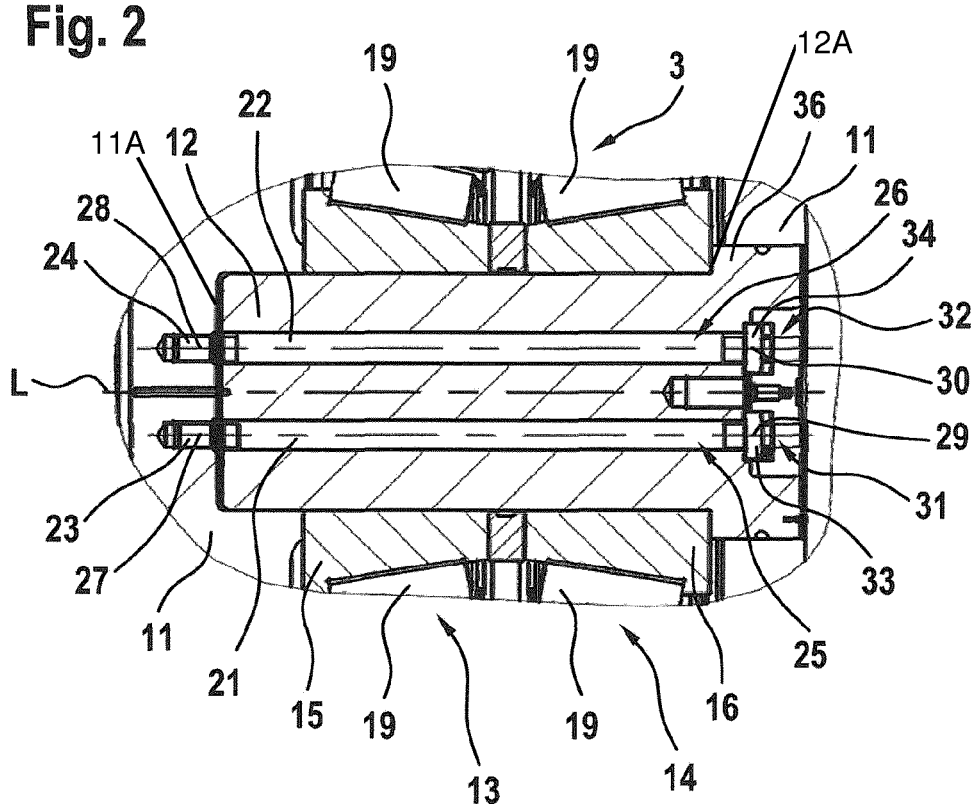
FIG. 2 is a representation of a longitudinal section through one part of a planetary carrier according to an embodiment of the invention within the planetary gearset for use in the wind turbine generator system according to FIG. 1.
Figure 3:
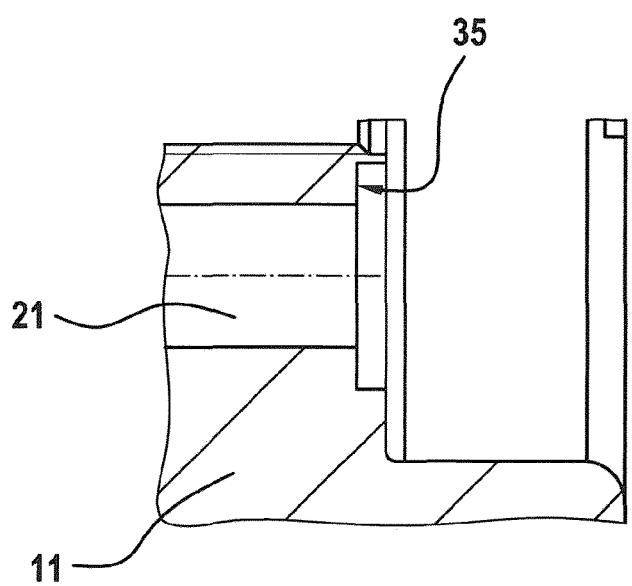
FIG. 3 is an enlarged detailed view of a planetary pin of the planetary carrier according to FIG. 2.
Figure 4:
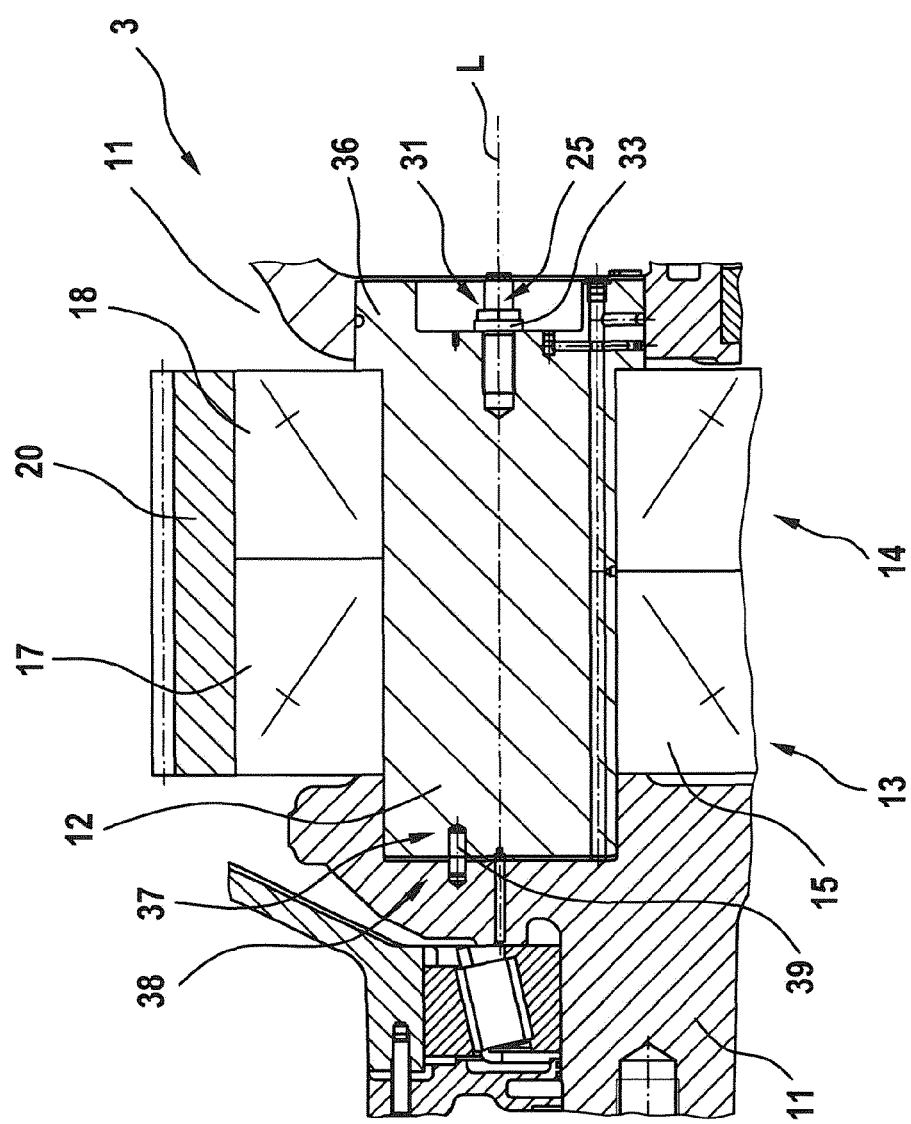
FIG. 4 is a representation of a longitudinal section of the planetary carrier according to FIG. 2 seen from a different sectional angle.

FIGS. 2 to 4 each show parts of a planetary carrier 11 of a gear stage of a planetary gearset, such as, for example, the planetary gearset 3 according to FIG. 1. The planetary carrier 11 comprises a planetary pin 12 with two tapered roller bearings 13, 14 disposed thereon. The tapered roller bearings 13, 14 are in an O-arrangement relative to each other and comprise respectively an inner ring 15, 16, an outer ring 17, 18, as well as a plurality of tapered roller bodies 19 disposed there-between. The outer rings 17, 18 of the tapered roller bearings 13, 14 rest against the inner side of a planet gear 20, and they are connected thereto in a rotationally fixed manner. Alternatively, it is possible to provide that the tapered roller bearings 13, 14 do not have outer rings 17, 18 and that the roller bodies 19 are instead disposed directly in the planetary gear 20. The inner rings 15, 16 of the tapered roller bearings 13, 14 rest against the outer side of the planetary pin 12 and are connected thereto in a rotationally fixed manner.

A first through bore 21 and a second through bore 22 having the same diameters axially traverse the planetary pin 12, meaning parallel relative to the longitudinal axis L thereof, connecting the opposing front sides of the planetary pin 12 to each other. One of the two threaded bores 23, 24, respectively, having the same diameter inside the planetary carrier 11 follows the through bore 21 and 22, wherein the diameter of the threaded holes 23, 24 is somewhat smaller than that of the through bores 21, 22. Respectively one of two pin screws 25, 26 having the same diameters is inserted through the through bores 21, 22, wherein the diameter of the pin screws 25, 26 is smaller in the area of the through bores 21, 22 than the diameter of the through bores 21, 22. Alternatively, it is possible to provide for a single through bore, a single pin screw and a single threaded hole to be disposed and having the characteristics as captioned above.

The pin screws 25, 26 each have a stud end 27, 28 with an external thread by which they are screwed into the mated threaded bores 23, 24. Opposite to the stud ends, the pin screws 25, 26 each have a nut end 29, 30 with an external thread. One nut 31, 32 each is screwed via the internal threads that match the external threads of the nut ends 29, 30 onto one of the pin screws 25, 26 in the area of the nut ends 29, 30 thereof.

The nuts 31, 32 each include an integrated washer 33, 34, which also constitutes a centering element in form of a centering hub of the respective nut 31, 32. The washers 33, 34 and/or the centering hubs are each located inside a suitable depression 35 of the planetary pin 12, whereby they are aligned. This alignment achieves, at the same time, a centering of the pin screws 25, 26 within the through bores 21, 22, whereby it is possible to safely avoid any contact between the pin screws 25, 26 and the through bores 21, 22. The nuts 31, 32 are tightened by means of a hydraulic fastening method. This causes a radial recess 35 of the planetary pin 12 to press in axial direction on an inner part of the front side of the inner ring 16 of the corresponding tapered roller bearing 14, as depicted in FIGS. 2 and 4, whereby the tapered roller bearings 13, 14 are pretensioned.

As seen in FIG. 4, an axially extending positioning bore 37 starts on the front side of the planetary pin 12, which is seen on the left in FIG. 4. The planetary carrier 11 has a second positioning bore 38 that follows directly after the first positioning bore 37 extending at the same height and having the same diameter as the first positioning bore 37. The position-securing element in form of a cylindrical retaining pin 39 was initially inserted in part into the second positioning bore 38. The planetary pin 12 was then inserted by its first positioning bore 37 on the part of the retaining pin 39 protruding from the planetary carrier 11, whereby a rotational alignment of the planetary pin 11 relative to the planetary carrier 13 was achieved. Alternatively, the positioning bores 37, 38 can be envisioned as having slightly different diameters, thereby ensuring particularly easy assembly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Wind turbine generator system
2 Hub
3 Planetary gearset
4 First gear stage
5 First gear stage
6 Tab
7 Generator
8 Slip ring unit
9 Azimuth bearing
10 Tower
11 Planetary carrier
12 Planetary pin
13, 14 Tapered roller bearing
15, 16 Inner ring
17, 18 Outer ring
19 Roller body
20 Planet gear
21, 22 Through bore
23, 24 Threaded bore
25, 26 Pin screw
27, 28 Stud end
29, 30 Nut end
31, 32 Nut
33, 34 Washer/Centering hub
35 Depression
36 Radial recess
37 First positioning bore
38 Second positioning bore
39 Retaining pin

The invention claimed is:

1. A planetary carrier for a gear stage, the planetary carrier comprising:
   at least one planetary pin that is disposed in a rotationally fixed manner in the planetary carrier, and
   a pair of tapered roller bearings that are disposed on the planetary pin supporting a planet gear,
   wherein the planetary pin is fastened by a pin screw connection, which comprises a pin screw and a nut, to the planetary carrier,
   wherein the tapered roller bearings are clamped against each other between the planetary carrier and the planetary pin and are axially pretensioned by the pin screw connection, and wherein a tightening of the pin screw connection is configured to cause a radial recess of the planetary pin to press in an axial direction on a radially inner part of one of the pair of tapered roller bearings thereby axially pretensioning the pair of tapered roller bearings.

2. The planetary carrier according to claim 1, wherein a through bore traverses the planetary pin in a longitudinal direction thereof, and wherein the pin screw extends within the through bore at a distance relative to the planetary pin.

3. A planetary carrier for a gear stage of a planetary gearset, the planetary carrier comprising:
- at least one planetary pin that is disposed in a rotationally fixed manner in the planetary carrier, and
- a pair of tapered roller bearings that are disposed on the planetary pin supporting a planet gear,
- wherein the planetary pin is fastened by a pin screw connection, which comprises a pin screw and a nut, to the planetary carrier, and
- wherein the tapered roller bearings are clamped against each other between the planetary carrier and the planetary pin and are axially pretensioned by the pin screw connection,
- wherein the nut has a centering element that is aligned in a depression of the planetary pin.

4. The planetary carrier according to claim 3, wherein the centering element is formed by a centering hub, a centering recess, a centering bush or a centering register.

5. The planetary carrier according to claim 1, wherein the nut has an integrated washer.

6. The planetary carrier according to claim 1, wherein a position-securing element is eccentrically disposed relative a longitudinal axis of the planetary pin in the planetary pin and the planetary carrier.

7. The planetary carrier according to claim 6, wherein the position-securing element is formed by a cylindrical pin, a taper pin, or a retaining bush.

8. A planetary gearset having the planetary carrier according to claim 1.

9. A wind turbine generator system with the planetary gearset according to claim 8.

10. A method for pretensioning a pair of tapered roller bearings in a planetary carrier according to claim 1, wherein the nut is tightened by a hydraulic fastening method.

11. The planetary carrier according to claim 3, wherein the nut has an integrated washer.

12. The planetary carrier according to claim 3, wherein a position-securing element is eccentrically disposed relative a longitudinal axis of the planetary pin in the planetary pin and the planetary carrier.

13. The planetary carrier according to claim 12, wherein the position-securing element is formed by a cylindrical pin, a taper pin, or a retaining bush.

14. A wind turbine generator system with the planetary carrier according to claim 3.

15. A method for pretensioning a pair of tapered roller bearings in a planetary carrier according to claim 3, wherein the nut is tightened by a hydraulic fastening method.

16. The planetary carrier according to claim 1, wherein the tapered roller bearings are clamped against each other between the planetary carrier and the planetary pin and are axially pretensioned by the pin screw connection by virtue of a first annular surface of the planetary pin contacting and exerting a force on one of the pair of tapered roller bearings and a surface of the planetary carrier contacting and exerting a force on the other of the pair of tapered roller bearings.

* * * * *